(12) United States Patent
Franchi

(10) Patent No.: US 6,431,441 B1
(45) Date of Patent: Aug. 13, 2002

(54) DATA READING SYSTEM IN AN ELECTRIC COMPONENT MEMORY

(75) Inventor: Olivier Franchi, Chaville (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/331,860

(22) PCT Filed: Dec. 29, 1997

(86) PCT No.: PCT/FR97/02445

§ 371 (c)(1),
(2), (4) Date: Aug. 16, 1999

(87) PCT Pub. No.: WO98/29842

PCT Pub. Date: Jul. 9, 1998

(30) Foreign Application Priority Data

Dec. 27, 1996 (FR) ............................................. 96 16242

(51) Int. Cl.[7] ................................................. G06K 5/00
(52) U.S. Cl. ........................................ 235/380; 235/441
(58) Field of Search ................................ 235/380, 441, 235/492; 705/17, 41

(56) References Cited

U.S. PATENT DOCUMENTS

| | | | | | |
|---|---|---|---|---|---|
| 4,797,543 | A | * | 1/1989 | Watanabe | 235/492 |
| 5,276,311 | A | * | 1/1994 | Hennige | 235/380 |
| 5,789,732 | A | * | 8/1998 | McMahon et al. | 235/380 X |
| 6,003,769 | A | * | 12/1999 | Ebbing | 235/380 |
| 6,237,848 | B1 | * | 5/2001 | Everett | 235/380 |

FOREIGN PATENT DOCUMENTS

| | | | |
|---|---|---|---|
| EP | 0168836 | | 1/1986 |
| FR | 2619463 | | 2/1989 |
| JP | 1-212331 A | * | 8/1989 |
| WO | WO-94/23399 | * | 10/1994 |

OTHER PUBLICATIONS

Ebbing, Device for reading data from or entering data into memory cards, Dec. 19, 1996, translation of abstract only of DE 19522029 A1, from Derewnt database.*

* cited by examiner

Primary Examiner—Michael G. Lee
Assistant Examiner—Jared J. Fureman
(74) Attorney, Agent, or Firm—Cohen, Pontani, Lieberman & Pavane

(57) ABSTRACT

A read system for reading at least one data item written in a memory (113) of an electronic component (11), the electronic component being suitable for communicating with a terminal and in particular for issuing an "initialization response" message (MRI) in response to an initialization signal (SI) issued by the terminal. The read system searches for the data item (DATA) in the memory (113) and writes the data item in an initialization response message zone. A reader unit (20) issues the initialization signal (SI) when the electronic component (111) is connected to the unit (20), and reads the data item (DATA) in the initialization response message zone. The reader unit also issues the initialization signal (SI) upon actuation of a forced initialization device (23).

11 Claims, 3 Drawing Sheets

DATA READING SYSTEM IN AN ELECTRIC COMPONENT MEMORY

FIELD OF THE INVENTION

The present invention relates to a system for reading at least one data item written in a memory of an electronic component, and also to a method of reading at least one such data item.

A particularly advantageous application of the invention lies in the field of electronic memory cards, in particular cards in which the memory contains data relating to the results of transaction operations, e.g. as performed by means of said cards, for example units remaining in a phone card or credit available in an electronic purse.

BACKGROUND OF THE INVENTION

In very general terms, electronic components in memory cards are designed to be capable of communicating and exchanging data of various types with the terminals with which they are connected for the purpose of effecting the operations which are to be performed. In particular, the procedure of setting up communication includes an initial stage during which the electronic component receives an initialization signal from the terminal, and then in turn sends an "initialization response" message to the terminal, which message contains the information required by the terminal to establish dialog with the component.

Systems are also known for reading data from an electronic memory card, which systems are essentially constituted by a housing into which the card is inserted so as to establish electrical contact between the electronic component and a connector contained in the unit. Said unit also includes software in a read only memory (ROM) enabling data to be interchanged with the electronic component for the purpose of reading data from the memory of the component and displaying said data on display means, such as a liquid crystal display screen.

Nevertheless, those known reader systems suffer from the drawback that the software used must be adapted specifically to the card whose data is to be read, and as a result it is necessary to store as many pieces of software in the memory of the unit as there exist types of cards to be processed, which takes up a relatively large amount of room in the unit due to the size of the memory.

Published Document WO-94/23399 describes a read system in which for the purpose of reading n DATA items, it is necessary to insert the card into the reader n times and to withdraw it n-1 times. In parallel with reading a data item DATAn, a pointer signifying "DATAn read" is written in the EEPROM of the card. The multiple withdrawals and reinsertions of the card in the reader constitute handling operations that are tedious to perform. Untimely withdrawal of the card at the moment that writing is taking place in the EEPROM can give rise to integrity defects in the data written in the memories.

SUMMARY OF THE INVENTION

An object of the present invention is to provide an improved technique for reading at least one data item written in a memory of an electronic component, said electronic component being suitable for communicating with a terminal and in particular for issuing an "initialization response" message in response to an initialization signal issued by said terminal.

This and other objects are attained in accordance with one aspect of the present invention which comprises:

in the electronic component, searching means for searching for the data item in the memory and for writing said data item in an initialization response message zone; and a reader unit comprising:
  means for issuing said initialization signal when the electronic component is connected to the unit; and
  means for reading the data item in said initialization response message zone.

The procedure for initializing electronic memory cards, i.e. the formats of the initialization signal and of the initialization response message, are standardized by the standard ISO 7816-3, which is hereby incorporated by reference so it will be understood that the data reading system of the invention is of universal nature and can be used with all existing cards. This means that the system is simplified considerably compared with systems known in the state of the art, thereby making it possible to reduce the size of the reader unit.

In accordance with the invention, it is advantageous for said unit to have display means for displaying said data, after it has been read, thereby enabling the user to inspect visually the value of the data item read by the system of the invention.

In accordance with another aspect of the invention, in order to enable a plurality of data items written in the memory of a single electronic component to be read, the invention provides for said unit to be provided with forced initialization means for enabling said means for issuing an initialization signal to be actuated at will so that the data written in the memory in locations numbered 1 to N, can be read cyclically and in sequence on each actuation of said forced initialization means, with the data in location 1 being read on the electronic component being connected to the unit.

Advantageously, the read system in accordance with a specified aspect of the invention includes an electronic component that further comprises a volatile memory in which data is written indicating that data item DATAi has been read or that data item DATAi+1 is to be read, and means enabling the power supply to the electronic component to be conserved during cyclic reading in sequence of the data items DATA2, ..., DATAN.

A further aspect of the present invention provides a read method for reading at least one data item written in a memory of an electronic component, said electronic component being suitable for communicating with a terminal, and in particular for issuing an initialization response message in response to an initialization signal issued by said terminal, the method being characterized in that it comprises the following steps, in which:

the electronic component is connected to a reader unit;

the unit issues an initialization signal;

the electronic component searches for the data item in the memory and writes said data item in an initialization response message zone; and the data item is read from said initialization response message zone.

Yet another aspect of the invention further includes the following step, in which:

forced initialization means actuate the initialization signal (SI) issuing means so that for the data items DATA1, ..., DATAN written in the memory being numbered 1 to N, with the data item DATA1 of rank 1 being read as soon as the electronic component is connected to the unit, and the data items DATA2, ..., DATAN being subsequently read cyclically and in sequence on each actuation of said forced initialization means. When a data item DATAi is read, a volatile memory of the component is written so as to contain data signifying that the data item DATAi has been read or that the data item DATAi+1 is to be read. To read a data item DATAi, the state of the volatile memory is verified. The power supply to the electronic component is maintained throughout cyclical reading of the data items DATAi.

BRIEF DESCRIPTION OF THE DRAWINGS

The following description with reference to the accompanying drawings given as non-limiting examples serves to improve understanding of what the invention involves and how it can be implemented.

DETAILED DESCRIPTION OF THE INVENTION

Figure 1:
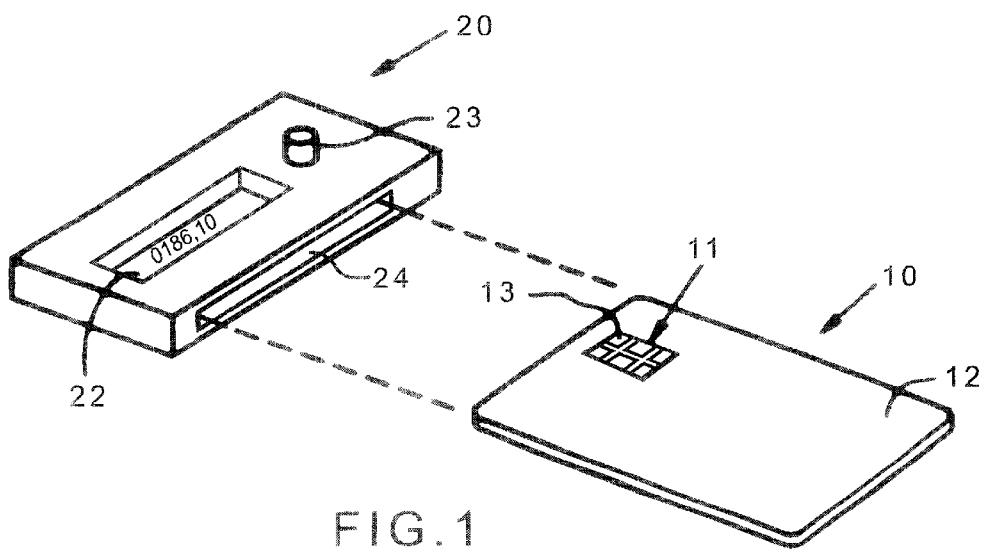
FIG. 1 is a perspective view of a system of the invention for reading data, the system comprising an electronic memory card and a reader unit.

FIG. 1 is a perspective view of an electronic memory card 10 of the ISO card type for effecting electronic transactions, comprising an electronic component 11 inserted in a card body 12 made of plastics material. In conventional manner, the electronic component 11 is provided with electrical contacts, given overall reference 13, for coming into electrical connection with a connector disposed in an electronic transaction terminal.

Figure 2:
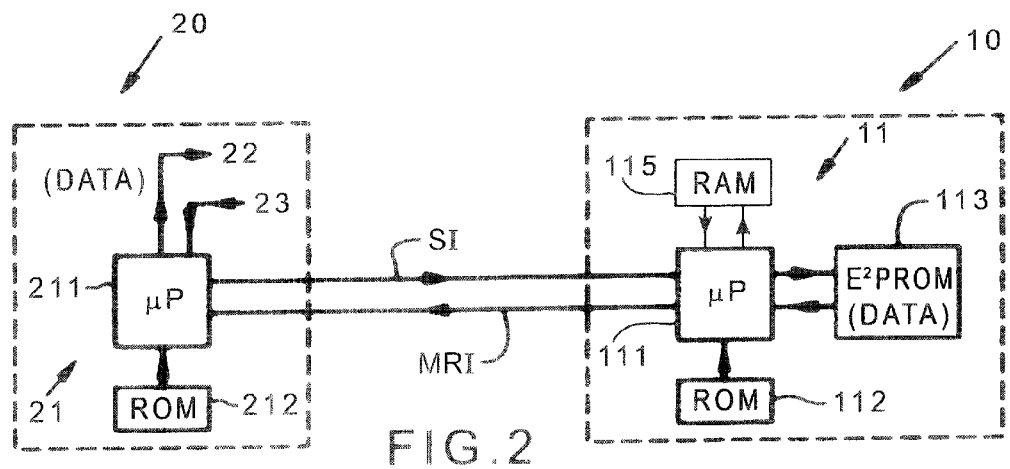
FIG. 2 is a block diagram of the electronic circuit of the reader system of FIG. 1.

As shown in FIG. 2, the electronic component 11 comprises not only the electrical contacts 13, but also a microprocessor 111, an associated read only memory (ROM) 112, a volatile memory RAM 115, and a rewritable memory 113 of the E²PROM type in which at least one data item DATA is written that is representative, for example, of the result of an electronic transaction.

In order to enable the proprietor of an electronic memory card to have easy access at any time to certain data items contained in the memory 113 of the electronic component 11, such as the balance available in an electronic purse, the invention proposes a unit 20, as shown in FIG. 1, which unit is suitable for receiving the electronic memory card 10 through a slot 24 designed for this purpose, and for entering into communication with the electronic component 11 by means of a connector (not shown) co-operating with the electrical contacts 13.

FIG. 2 shows that the unit 20 has an electronic circuit 21 constituted by a microprocessor 211 and an associated read only memory 212, the assembly being configured in such a manner as to form means for issuing an initialization signal when the electronic component 11 is connected to the unit 20, exactly in the same manner as in any other terminal.

When the card is not powered, i.e. when the power supply voltage is zero (Vcc OFF), the RAM 115 of the card, e.g. constituting a memory space of 3 bytes, is in an undefined state. When the card is inserted in the slot 24 of the unit 20, so that the component 11 is connected to the connector of the reader, said component is powered and the power supply voltage is then said to be Vcc ON. Information interchange between the electronic component 11 and a terminal (not shown) begins with an initialization procedure satisfying the above-mentioned ISO standard 7816-3. During this procedure, the microprocessor 111 of the card verifies whether the RAM 115 is in a defined or a non-defined state. When the RAM 115 is in a non-defined state, the terminal sends a "reset" initialization signal SI1 to the component. The electronic component responds by sending an "answer to reset" (ATR) initialization response message MRI1 to the terminal. This message contains information that is essential for communication between the terminal and the component. Other information, such as historical characters is optional since it relates, for example, only to the name of the manufacturer of the card, the electronic component included in the card, the ROM, etc.

The initialization protocol thus continues by the electronic component 11 sending an initialization response message MRI1 as generated by the microprocessor 111 of the component in such a manner as to write in a zone of said message the value of data item DATA1 which is to be read by the unit 20. For example, this zone may be the zone provided for the above-mentioned historic characters.

In parallel with sending the message MRI1, the microprocessor 111 of the card writes a data item in the RAM 115 signifying that the data item DATA1 has been read or that the data item DATA2 is to be read. The RAM 115 then passes from an undefined state to a defined state comprising a data item representing the data item that has been read or that is to be read.

Figure 3:
FIG. 3 is a diagram showing the structure of an initialization response message.

Naturally, as shown in FIG. 3, when a plurality N of data items is to be read, each data item DATAi (i=1, . . . N) is identified in the message MRIi by its rank number i.

Figure 5:
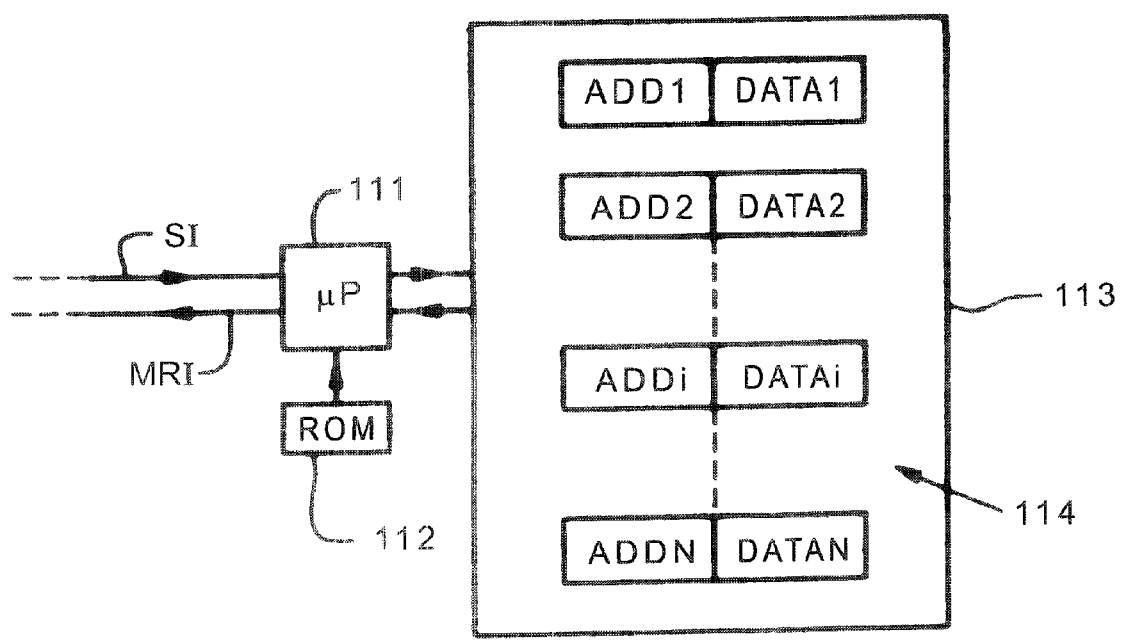
FIG. 5 is a diagram showing how the rewritable memory of the electronic component of FIG. 2 is organized.

The mechanism for searching for the data item to be read and for writing it in the initialization response message is performed by the microprocessor 111 in the rewritable memory 113 by means of a file 114 as shown in FIG. 5 which, for each data item DATAi as defined by its rank i (zone–of FIG. 3) specifies the path giving access to said data item in the memory 113.

As can be seen in FIG. 2, the microprocessor 211 of the electronic circuit 21 of the unit receives the initialization response message MRIi from the electronic component 11 of the card 10 and reads the data item DATAi in the message zone 33 of FIG. 3 where it has been written, for the purpose of forwarding it for display purposes to the display means 22 of the unit 20, such as a liquid crystal display.

When a plurality N of data items is to be read and displayed, provision is made, as shown in FIG. 1, for the unit 20 to be provided with forced initialization means 23, e.g. a pushbutton, designed to enable the initialization signal SI to be issued at will by the microprocessor 211 so that the data item DATA1 of rank 1 is read first upon the electronic component 11 being connected to the unit 20, with the following data items DATA2, . . . , DATAN subsequently being read cyclically and in sequence on each occasion that said forced initialization means 23 is actuated.

Figure 4:
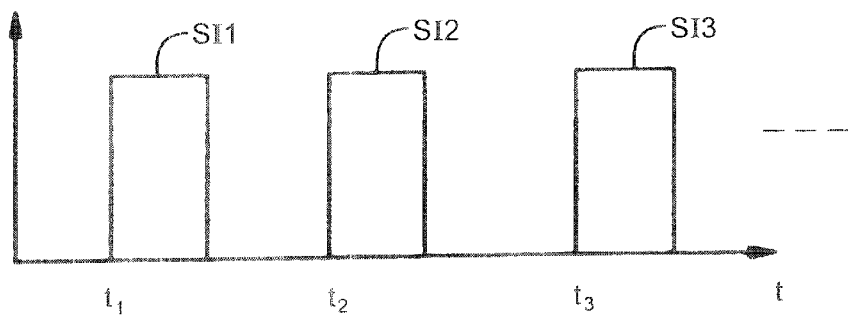
FIG. 4 is a timing chart showing a sequence of initialization signals.
Figure 6:
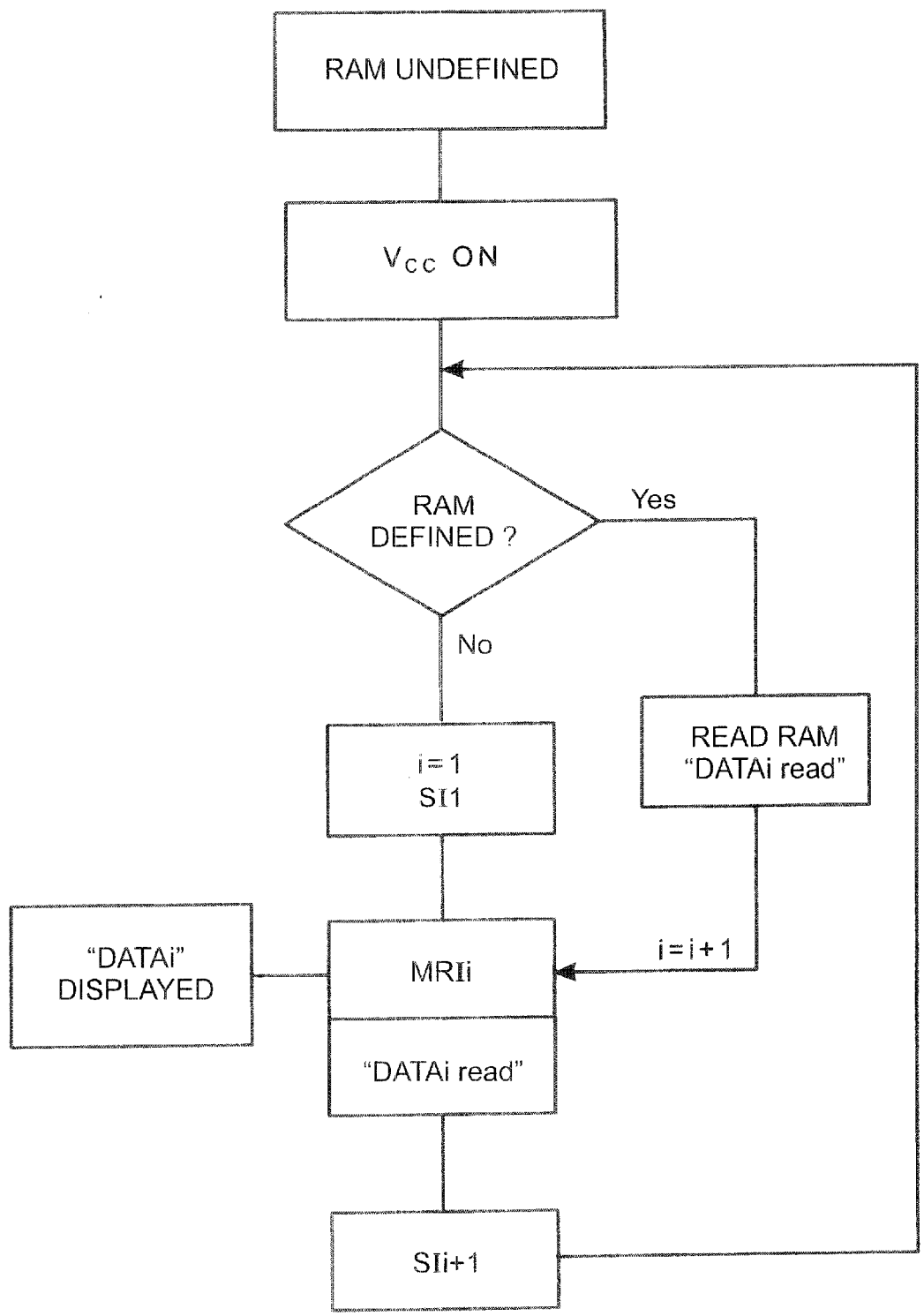
FIG. 6 is a flow chart showing the various steps in implementing the invention.

The reader system of the invention operates in the manner summarized below with reference to FIGS. 4 and 6.

If at instant t1 the user of the system decides to read the information contained in an electronic memory card 10, the user inserts the card in the unit 20, thereby causing a first initialization signal SI1 to be issued automatically, together with the initialization response message MRI1 which contains all of the data DATA1. On setting this apparatus into operation, the microprocessor 211 reads the first data item DATA1 and displays it on the screen 22. If at instant t2 the user seeks to read the value of the second data item DATA2, the card is left in the slot 24 of the reader. The power supply voltage Vcc is not interrupted (Vcc ON). The user presses on the pushbutton 23 which forces a second initialization signal SI2 to be issued. Following this second initialization signal SI2, the microprocessor 111 of the card verifies the defined or undefined state of the RAM 115. Given that the RAM 115 was written to at the same time as the message MRI1 was sent, the RAM is now in a defined state. Its content signifying "DATA1 read" or "DATA2 to be read" is read, and the microprocessor 111 of the card looks for the address of DATA2 in the file 114. A message MRI2 is then sent to reader. However, this time the microprocessor 211 reads the second data item DATA2 and displays it. Naturally, if there is only a single stored item to be read, then the same item is displayed each time the pushbutton 23 is actuated.

The process is continued in the same manner if at instant t3 the user desires to read the third data item DATA3.

At the (N−1) th actuation of the pushbutton 23, the last variable DATAN is displayed, with a return to the first data item DATA1 on the Nth actuation, and so on.

The system is reset to zero each time the card 10 is disconnected from the unit 20, with the first data item to be displayed always being the item DATA1 of rank 1.

This resetting to zero is due to the fact that by interrupting the power supply the RAM 115 is returned to an undefined state.

What is claimed is:

1. A read system for reading at least one data item written in a memory (113) of an electronic component (11), said electronic component being suitable for communicating with a terminal and in particular for issuing an initialization response message (MRI) in response to an initialization signal (SI) issued by said terminal, said read system comprising:

in the electronic component (11), searching means (111, 114) for searching for a data item (DATA) in a memory (113) and for writing said data item in an initialization response message zone (MRI); and a reader unit (20) comprising:
generating means (211) for automatically issuing said initialization signal (SI) upon the electronic component (11) being connected to the reader unit (20); and
reading means (211) for reading the data item (DATA) in said initialization response message zone (MRI), said read system being characterized in that said reader unit (20) includes forced initialization means (23) to actuate said generating means (211) for issuing additional ones of said initialization signal (SI) while the electronic component (11) remains connected to the reader unit (20), and said reading means reads data items (DATA1, . . . , DATAN) written in the memory (113) and numbered 1 to N such that the data item (DATA1) of rank 1 is read upon the electronic component (11) being connected to the reader unit (20), and the data items (DATA2, . . . , DATAN) are respectively read in sequence on issuance of each of said additional ones of said initialization signal (SI).

2. A ready system according to claim 1, characterized in that said unit (20) has display means (22) for displaying said data item (DATA) after reading the data item.

3. A read system according to claim 1, characterized in that said searching means comprise, in the memory (113) in the electronic component (11), a file (114) giving the access path in the memory (113) for each data item (DATAi) defined by rank (i) of the data item.

4. A read system according to claim 1, characterized in that the electronic component further has a volatile memory in which a data item is written signifying that the data item (DATAi) has been read or that the data item (DATAi+1) is to be read.

5. A read system according to claim 1, characterized in that the read system includes means for ensuring that the power supply to the electronic component is conserved during cyclical reading in sequence of the data items (DATA2, . . . , DATAN).

6. A read system according to claim 1, characterized in that the forced initialization means (23) is designed to actuate said means (211) for issuing an initialization signal (SI) at will and that the data items are subsequently read cyclically.

7. A read method for reading at least one data item written in a memory (113) of an electronic component (11), said electronic component being suitable for communicating with a terminal, and in particular for issuing an initialization response message (MRI) in response to an initialization signal (SI) issued by said terminal, wherein the method comprises the following steps:

upon the electronic component (11) being connected to the terminal, the terminal automatically issues an initialization signal (SI), the electronic component (11) searches for the data item (DATA) in the memory (113) and writes said data item in an initialization response message zone (MRI), and the data item (DATA) is read from said initialization response message zone (MRI); and actuating the issuance of additional ones of said initialization signal (SI), while the electronic component remains connected to the reader unit, and reading data items (DATA1, . . . , DATAN) written in the memory (113) being numbered 1 to N, with the data item (DATA1) of rank 1 being read upon the electronic component (11) being connected to the terminal, and the data items (DATA2, . . . , DATAN) being respectively read in sequence on issuance of each of said additional ones of said initialization signal.

8. A read method according to claim 7, characterized in that when a data item (DATAi) is read, a volatile memory (RAM) of the component is written so as to contain data signifying that the data item (DATAi) has been read or that the data item (DATAi+1) is to be read.

9. A read method according to claim 7, characterized in that to read a data item (DATAi), the state of the volatile memory (RAM) is verified.

10. A read method according to claim 7, characterized in that a power supply to the electronic component is maintained throughout cyclical reading of the data items (DATAi).

11. A read method according to claim 7, characterized in that the data items (DATA2, . . . , DATAN) are subsequently read cyclically and in sequence.

* * * * *